(12) United States Patent
Drabon et al.

(10) Patent No.: US 8,925,909 B2
(45) Date of Patent: Jan. 6, 2015

(54) LEAF SPRING ARRANGEMENT

(75) Inventors: Rodscha Drabon, Salzkotten (DE); Ulrich Mueller, Langweid am Lech (DE); Peter Stastny, Delbrück (DE)

(73) Assignee: Benteler SGL GmbH & Co. KG, Paderborn (DE)

( * ) Notice: Subject to any disclaimer, the term of this patent is extended or adjusted under 35 U.S.C. 154(b) by 4 days.

(21) Appl. No.: 13/515,727

(22) PCT Filed: Dec. 15, 2010

(86) PCT No.: PCT/DE2010/001468
§ 371 (c)(1),
(2), (4) Date: Jun. 13, 2012

(87) PCT Pub. No.: WO2011/072652
PCT Pub. Date: Jun. 23, 2011

(65) Prior Publication Data
US 2012/0267835 A1 Oct. 25, 2012

(30) Foreign Application Priority Data
Dec. 15, 2009 (DE) .......................... 10 2009 058 170

(51) Int. Cl.
*B60G 11/10* (2006.01)
*B60G 11/04* (2006.01)

(52) U.S. Cl.
CPC ........ *B60G 11/04* (2013.01); *B60G 2206/7101* (2013.01); *B60G 2204/121* (2013.01)
USPC ......... 267/260; 267/407; 267/47; 280/124.17

(58) Field of Classification Search
CPC .......... F16F 1/3686; F16F 1/26; B60G 11/04; B60G 11/10; B60G 11/12; B60G 2204/121; B60G 2206/7101
USPC ......................... 267/40, 43, 44, 45, 260, 261; 280/124.163, 124.17, 124.174
See application file for complete search history.

(56) References Cited

U.S. PATENT DOCUMENTS 2,175,230 A * 10/1939 Thompson ...................... 267/47
3,511,493 A * 5/1970 Burrell ............................ 267/47
3,900,357 A * 8/1975 Huchette et al. .............. 156/185
3,968,958 A * 7/1976 Huchette et al. ................ 267/47

(Continued)

FOREIGN PATENT DOCUMENTS

| DE | 198 14 792 A1 | 10/1999 |
| DE | 101 39 780 A1 | 5/2002 |
| GB | 2 041 846 A | 9/1980 |
| JP | 54 025986 A | 2/1979 |

*Primary Examiner* — Thomas Irvin
(74) *Attorney, Agent, or Firm* — Henry M. Feiereisen LLC

(57) ABSTRACT

In a leaf spring arrangement for a chassis of a motor vehicle, a leaf spring includes multiple layers made of a glass fiber composite plastic, a reinforcement made of a carbon composite plastic and being disposed between an upper and a lower one of the layers, and a core made of a different material than the reinforcement and being disposed between the upper and lower layers, wherein the reinforcement is arranged along a longitudinal a side of the core. The leaf spring is coupled at its center region to an axle of the motor vehicle by a center connection and to the vehicle body by bodywork connections, wherein the leaf spring is tilted by an angle relative to the vertical axis of the motor vehicle.

8 Claims, 3 Drawing Sheets

(56) References Cited

U.S. PATENT DOCUMENTS

| | | | |
|---|---|---|---|
| 4,468,014 A * | 8/1984 | Strong | 267/47 |
| 4,688,778 A * | 8/1987 | Woltron | 267/148 |
| 4,747,898 A * | 5/1988 | Woltron | 156/153 |
| 5,248,130 A * | 9/1993 | Lisowsky | 267/47 |
| 6,012,709 A * | 1/2000 | Meatto et al. | 267/36.1 |
| 6,189,904 B1 * | 2/2001 | Gentry et al. | 280/124.175 |
| 6,361,032 B1 * | 3/2002 | Lawson | 267/158 |
| 6,422,540 B1 * | 7/2002 | Pfletschinger et al. | 267/47 |
| 6,461,455 B1 * | 10/2002 | Meatto et al. | 156/64 |
| 6,660,114 B2 * | 12/2003 | Meatto et al. | 156/64 |
| 6,679,487 B2 * | 1/2004 | Meatto et al. | 267/148 |
| 7,669,867 B2 * | 3/2010 | Kuraishi | 280/124.175 |

* cited by examiner

LEAF SPRING ARRANGEMENT

CROSS-REFERENCES TO RELATED APPLICATIONS

This application is the U.S. National Stage of International Application No. PCT/DE2010/001468, filed Dec. 15, 2010, which designated the United States and has been published as International Publication No. WO 2011/072652 A1 and which claims the priority of German Patent Application, Serial No. 10 2009 058 170.7, filed Dec. 15, 2009, pursuant to 35 U.S.C. 119(a)-(d).

BACKGROUND OF THE INVENTION

The invention relates to a leaf spring arrangement for a chassis of a motor vehicle.

The suspension and damping of a motor vehicle particularly affects the vertical vehicle vibrations. The design of the spring is decisive for the driving comfort, i.e. for the vibration stress on the occupants as well as the cargo. The suspension further plays a decisive role in driving safety. The known suspension elements include leaf springs which are used in automobiles as well as in the commercial vehicle sector. Leaf springs are constructed single or multilayered and in certain applications can also take over the function of wheel control. They enable a favorable force transmission into the vehicle body. The weight of leaf springs made of steel is not insignificant. Especially in the commercial vehicle sector however, weight savings are sought to be realized, in order to carry along as much cargo as possible while not exceeding the permissible total weight. Of course, lighter leaf springs also have a positive effect with regard to fuel consumption. Therefore, the state of the art includes the manufacturing of leaf springs not only from steel but also from glass fiber reinforced plastics (GFK), to save weight.

In rigid axles with longitudinal leaf springs made of glass fiber reinforced plastics the stiffness in Y-direction, i.e. transverse to the driving direction becomes smaller compared to leaf springs made of steel having the same spring width, even though the leaf springs made of GFK have the same stiffness as leaf springs made of steel in Z-direction, i.e. vertical relative to the vehicle.

The greater flexibility in Y-direction however, can have negative effects on the transverse guiding behavior of the vehicle, because a greater transverse offset of the axle results from transverse forces. The greater transverse offset can be counteracted in that leaf springs in which at least one layer is formed by a profiled metal section are used. Such a leaf spring is described in DE 198 147 92 A1. However, profiled metal sections have a higher weight than glass fiber reinforced plastics, so that the desired saving potential cannot be achieved by metal inserts. Further, the manufacturing process of such springs is complex.

JP 540 25 986 A2 proposes to cover an inner layer of a fiber reinforced plastic made of carbon fibers (CFK) on both sides with GFK-fibers, so that this three-layered arrangement has an overall higher strength. The stiffer CFK fibers have a lower weight and due to the higher stiffness or respectively, lower elasticity should be arranged in the region of the neutral fiber of the leaf spring, i.e. primarily in the central region. A significant disadvantage is however, that the CFK materials are significantly more expensive than glass fiber materials. Currently, the factor is about 1:16 for 1 kg of fibers.

DE 101 39 780 A1 discloses a composite leaf spring with improved lateral stiffness. The increase of the lateral stiffness is caused by introducing two carbon fiber inserts into the longitudinal side regions of a glass fiber composite spring. The volume amount of the carbon fiber inserts is preferably between 10 and 20 volume percent of the total volume of the spring and is a function of the load characteristics required in the suspension system. Glass fiber springs constructed as composite leaf springs are lighter compared to conventional steel leaf springs.

GB 2 041 846 A also discloses a leaf spring arrangement, wherein the central arrangement of the leaf spring has a support surface, on which the leaf spring is supported. The support surface is tilted at an angle relative to the vertical axis of the motor vehicle. Due to the horizontally oriented ends and the tilted center connection, the construction of the leaf spring is relatively elaborate because the direction of the force applied in the region of the center connection leads to a force component in Y-direction during deflection in Z-direction.

The invention is based on the object to provide a leaf spring arrangement for a chassis of a motor vehicle which is characterized by a small weight, cost-effective manufacturing and at the same time high stiffness against transverse forces.

This object is attained by a leaf spring arrangement in which a leaf spring is coupled with end sides thereof to a vehicle body by bodywork connections and in the middle region to a vehicle axle of the motor vehicle, by a center connection, wherein the leaf spring includes multiple layers of a glass fiber composite plastic, wherein a reinforcement made of a carbon fiber composite plastic is arranged between an upper layer made of glass fiber composite plastic and a lower layer made of glass fiber composite plastic, wherein at least one reinforcement is arranged along a longitudinal side of a core located between the upper and the lower layer which core is made of a different material than the reinforcements, wherein the center connection of the leaf spring has a support surface on which the leaf spring is supported, wherein the support surface is tilted relative to the vertical axis of the motor vehicle by an angle, and wherein center connections of a vehicle axle are tilted in the opposite direction, wherein the bodywork connection has a bearing axle for the ends of the leaf spring, wherein a plane which is perpendicular to the bearing axis is tilted relative to the vertical axis of the motor vehicle by an angle, and wherein the bearing axles of two leaf springs of a vehicle axle are tilted in the opposite direction.

Advantageous refinements of the invention are the subject matter of the sub claims.

The leaf spring arrangement for a chassis of a motor vehicle according to the invention includes a leaf spring, which is coupled at end sides thereof to a vehicle body by bodywork connections and in its center region to a vehicle axle, in particular a rigid axle of the vehicle by a center connection. The leaf spring is made in a known manner from several layers of a glass fiber composite plastic, wherein a reinforcement made of carbon fiber composite plastic (CFK) is arranged between an upper layer and a lower layer made of glass fiber composite plastic.

At least one reinforcement is arranged along a longitudinal side of a core which is located between the upper and the lower layer, wherein the core is made of glass fiber composite plastic. A reinforcement along a longitudinal side is used which is less expensive than a complete intermediate layer made of CFK. Here, the CFK reinforcement is only present along a longitudinal side, i.e. at a distance to the center longitudinal plane of the leaf spring. The reason is that with regard to laterally acting forces a core made of CFK contributes to a lesser degree to the bending stiffness in transverse direction because the greatest bending tensions occur at a distance to the neutral fiber and not in the neutral fiber. A further increase in lateral stiffness could be realized by a CFK core, wherein however, this measure would be incommensurate with the costs associated therewith when using the material CFK. Therefore, the material CFK is only used in regions of the leaf spring in which the highest bending tensions occur in transverse direction, so that high section moduli can be achieved.

In addition to the adjustment with regard to the material of the center layer of the leaf spring, the leaf spring is oriented overall so that a better transverse guiding is achieved. The center connection of the leaf spring has a support surface for supporting the leaf spring, wherein the support surface is inclined at an angle relative to the vertical axis of the motor vehicle.

The end-side bearing axles in the vehicle body connections are tilted by the angle Gamma. No change of the spring geometry is required. The same leaf springs can be used that can also be used in a horizontal bearing axis or respectively, in horizontally extending support surfaces.

Because the stiffness of the CFK increases the modulus of elasticity compared to leaf springs made of GFK in extension as well as in compression direction, the reinforcements are arranged on both longitudinal sides of the core. The reinforcements can have the same thickness as the core, wherein the thickness of the core or respectively, the reinforcements can vary over the longitudinal extension of the leaf spring. Typically, the thickness of the core as well as the leaf spring increases toward the center connection and decreases toward the vehicle body connections. It is conceivable, that only the thickness of the core or respectively, the thickness of the reinforcements is variable, while the upper and lower layer which is made of GFK has a constant thickness. Usually, the thickness of the GFK spring increases again towards the ends, because at this location a connection to the vehicle body has to be enabled. For this, corresponding bearings can be provided in the ends of the leaf spring.

The reinforcements themselves are each individually smaller than the core and extend preferably over a region from 20% to 50% of the width of the leaf spring.

Theoretically it is possible for the reinforcement to be broader than the bordering layers made of GFK. Because the reinforcement however, is also supported on the GFK layers which border on the upper and the bottom sides and therefore torsion of the reinforcements made of CFK is prevented, it is expedient when the reinforcements do not protrude longitudinally over the upper and lower layer made of GFK. In other words, it is regarded expedient when all layers have the same width.

The angle Gamma in all variants is preferably in a region from 1° to 20°, in particular in a region of from 1° to 5°.

BRIEF DESCRIPTION OF THE DRAWING

In the following, the invention is explained in more detail by way of the exemplary embodiments shown in the drawings. It is shown in FIG. 1 a schematic view of a rigid axle of a motor vehicle which is supported with steel leaf springs FIG. 2 a leaf spring made of GFK/CFK in a perspective view.

DETAILED DESCRIPTION OF PREFERRED EMBODIMENTS

Figure 1:
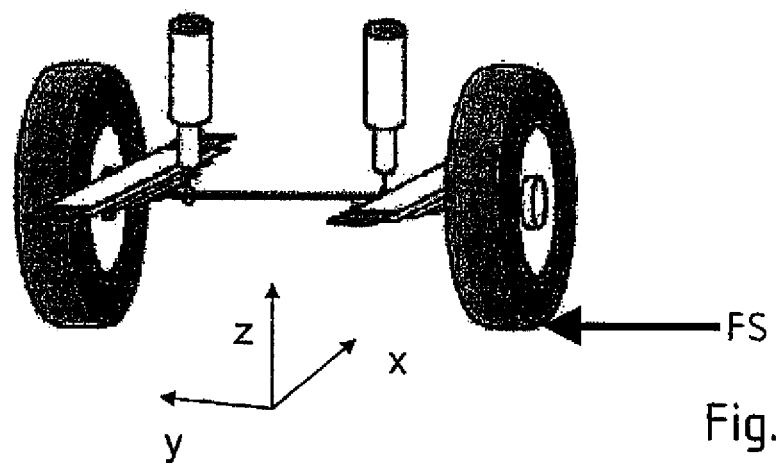

FIG. 1 shows a schematic representation of a vehicle axle, here a rigid axle as rear axle of a motor vehicle. Rigid axles are characterized in that the track gauge, the toe and the camber are always constant relative to the road and generally offer good tracking stability. The manufacturing costs are low. However, unfavorable deformation can result from transverse forces FS, which act in Y-direction, when the leaf springs are not made of steel, but from a fiber reinforced plastic.

Figure 2:
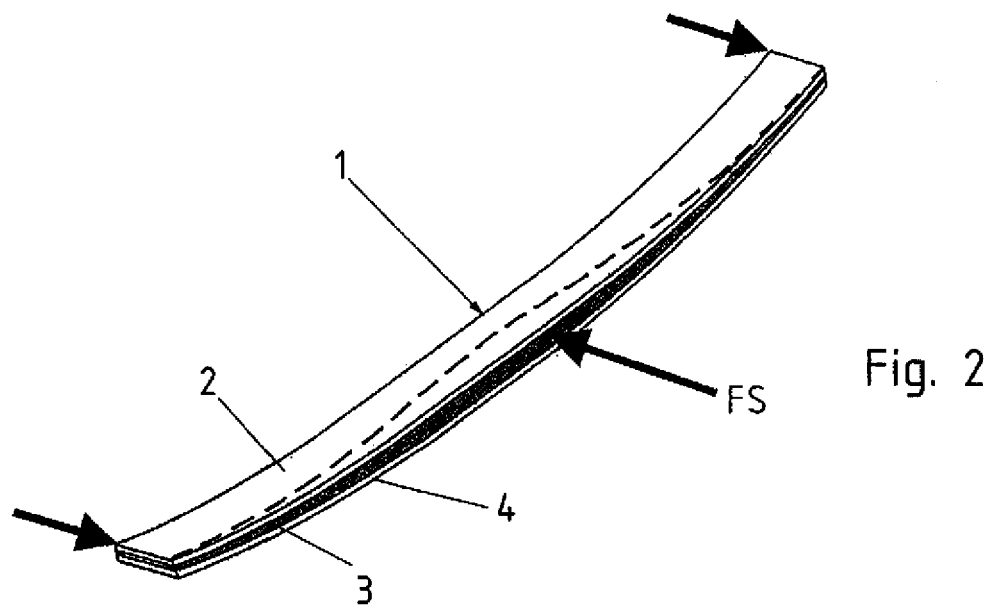

The leaf springs made of steel shown in FIG. 1 are replaced according to the invention by leaf springs made of a glass fiber reinforced material and a carbon fiber composite material (GFK/CFK). FIG. 2 shows such a leaf spring 1. The leaf spring is constructed three-layered and has an upper layer 2 made of GFK and a lower layer 3 made of GFK. Arranged between the upper and lower layers 2, 3 is a reinforcement 4 made of CFK. It can be seen from FIG. 2, that the center layer or respectively, the reinforcement in the center region of the leaf spring has a greater thickness than at the ends. In contrast, the upper and lower layers 2, 3 have a thickness which is constant over the entire length. In addition, the applied lateral force FS and the reaction forces are shown in FIG. 2, which act on the ends of the leaf spring 1. The dashed line represents an exemplary bending line which is established under the influence of the forces.

Figure 3:
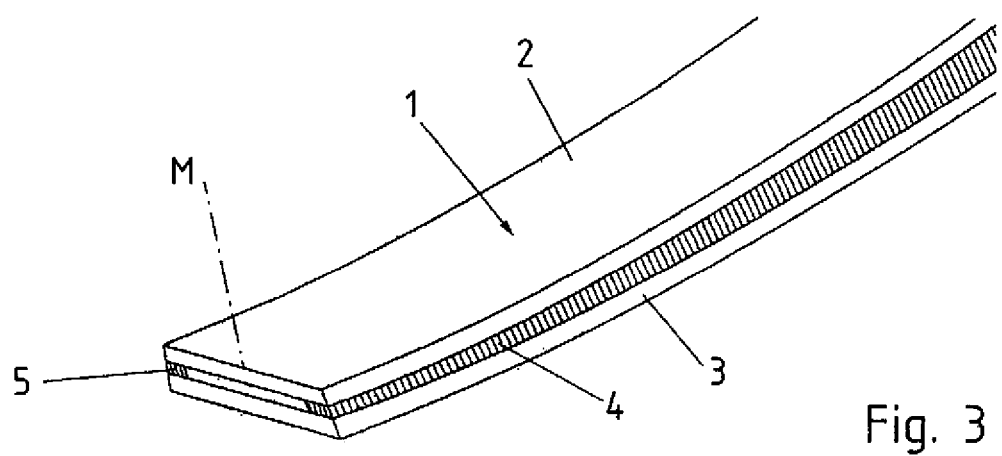
FIG. 3 an enlarged representation of an end of the leaf spring of FIG. 2.

From the slightly enlarged representation of FIG. 3 it can be seen that two reinforcements 4, 5 are arranged spaced apart between the upper and lower layers 2, 3. The reinforcements 4, 5 are configured identical, as can be seen from the exploded view of FIG. 4 or respectively, from the enlarged representation in FIG. 5. Located between the two reinforcements 4, 5 is a core 6 which is preferably made of GFK.

Figure 4:
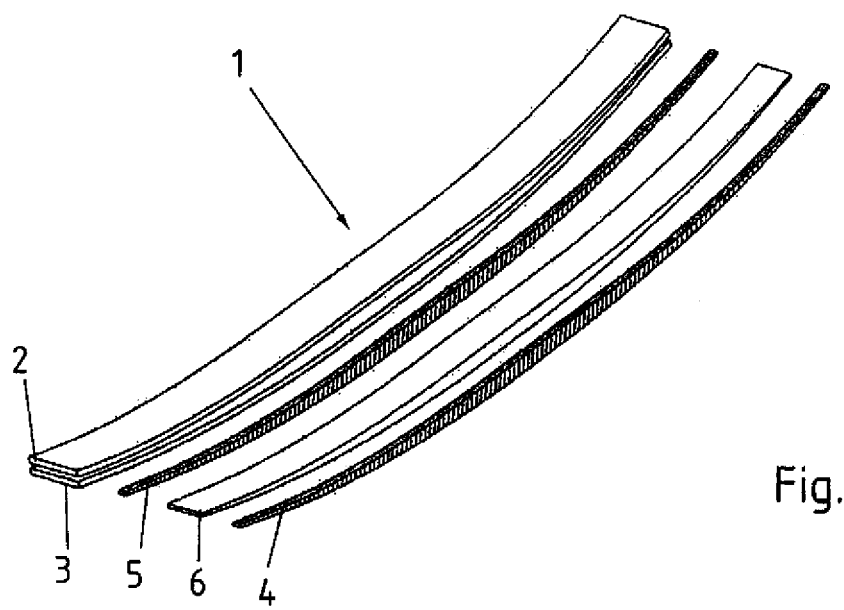
FIG. 4 the leaf spring of FIG. 2 in an exploded view.
Figure 5:
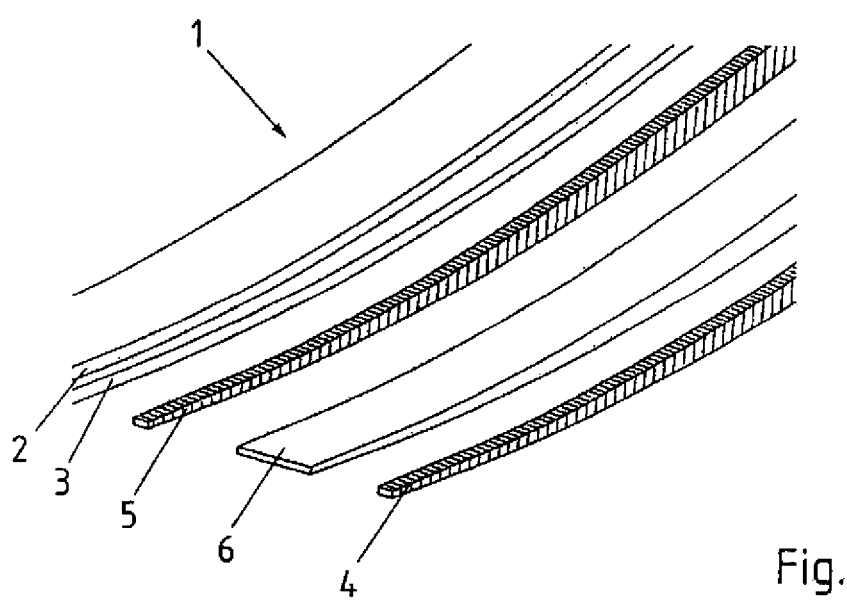
FIG. 5 an enlarged representation of a partial region of FIG. 4.

In this exemplary embodiment, the core is thus filled between the upper layer 2 and the lower layer 3 with a material mix made of GFK and CFK. No hollow spaces are present because the core 6 and the two lateral reinforcements 4, 5 completely fill the region between the layers. FIG. 4 clearly shows that the core 6 bulges in its center region, i.e. has a greater thickness toward the ends.

The core 6 is significantly broader than the reinforcements 4, 5. In this exemplary embodiment, the ratio is 3:2, i.e. the core 6 extends over about 60% of the width, while the two reinforcements 4, 5 which have the same width each extend over about 20% of the width. Overall, the core region is configured symmetrical, i.e. the two reinforcements 4, 5 lie at the same distance from the central vertical axis M or respectively, the transverse central plane which is not further drawn in and in which the central vertical axis M extends. It is conceivable that the arrangement is asymmetrical, i.e. that the reinforcements differ from one another in their width, or that the core is configured asymmetrical. A symmetry or asymmetry can also be present only in sub-regions of the leaf spring, so that a leaf spring is constructed symmetrically or asymmetrically in at least one longitudinal section, while the construction differs in other regions.

Figure 6:
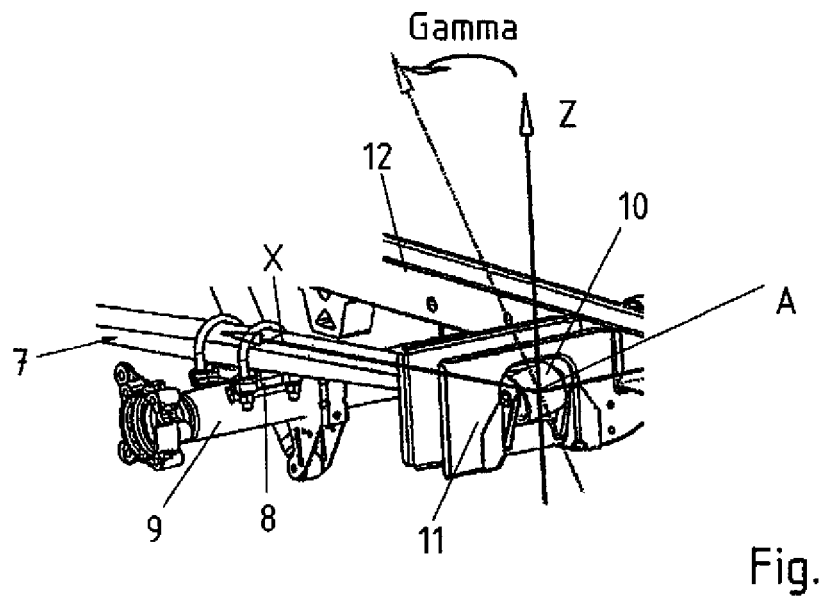
FIG. 6 a perspective view of a leaf spring connection.

FIG. 6 shows an embodiment of a leaf spring 7, which is connected via a center connection 8 to a vehicle axle 9 which is configured as rigid axle. The ends 10 of the leaf spring 7 are supported on a bodywork connection 11 of the vehicle body 12 for pivotal movement.

Figure 7:
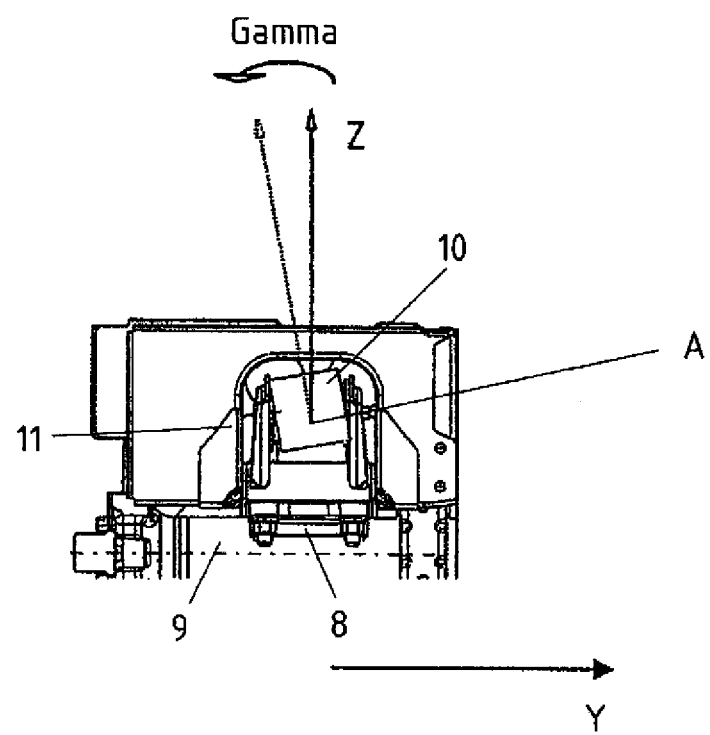
FIG. 7 the leaf spring connection of FIG. 6 in a front view.

The special feature is that the leaf spring 7 is rotated by a defined angle Gamma. The rotation axis is the longitudinal axis of the motor vehicle, i.e. the X-axis. The angle Gamma is here entered in relation to the vertical axis or Z-axis. Again FIG. 7 clearly shows that the bearing axis designated A of the end 10 of the leaf spring 7 does not point in the Y-direction, but was pivoted by the angle Gamma.

In this exemplary embodiment, the leaf spring 7 was pivoted by the angle Gamma away from the center of the vehicle. In case of an inclination of a wheel axle this would be referred to as a positive camber angle. In the present case, the wheel axle is not tilted however, but only the bearing axle A of the leaf spring 7.

Within the context of the invention, a second leaf spring on the same vehicle axle 9 is not shown. It is understood that the corresponding leaf spring at the other end of the vehicle axle is pivoted in the opposite direction, so that a symmetrical construction results. The angle Gamma in this exemplary embodiment is 10°.

The invention claimed is:

1. A leaf spring arrangement for a chassis of a motor vehicle, comprising:
    a leaf spring having a longitudinal axis comprising multiple layers made of a glass fiber composite plastic, at least one reinforcement made of a carbon composite plastic and being disposed between an upper one and a lower one of said multiple layers, and a core made of a different material than the at least one reinforcement and being disposed between said upper and lower layers, wherein the at least one reinforcement is arranged along a longitudinal side of the core;
    a center connection for coupling a center region of the leaf spring to an axle of the motor vehicle, said center connection having a support surface for supporting the leaf spring, wherein a transverse axis of the support surface is tilted in a first direction by an angle relative to a horizontal axis of the motor vehicle, said first direction being opposite to a second direction in which a transverse axis of a support surface of another center connection on the axle is tilted; and
    at least two bodywork connections for coupling the leaf spring to a vehicle body of the motor vehicle via respective ends of the leaf spring, each of said respective ends defining a bearing having a bearing axis defining a longitudinal extent of the bearing extending transversely to the longitudinal axis of the leaf spring, wherein the bearing axis is tilted in the first direction by said angle relative to the horizontal axis of the motor vehicle.

2. The leaf spring arrangement of claim 1, wherein the core is made of a glass fiber composite plastic.

3. The leaf spring arrangement of claim 1, further comprising at least two of said at least one reinforcement, wherein the at least two reinforcements are arranged in one to one correspondence on both sides of the core.

4. The leaf spring arrangement of claim 1, wherein the at least one reinforcement has a same thickness as the core.

5. The leaf spring arrangement of claim 3, wherein the at least two reinforcements together extend over 20% to 50% of a width of the leaf spring.

6. The leaf spring arrangement of claim 1, wherein the at least one reinforcement does not protrude over longitudinal sides of the upper and lower layers.

7. The leaf spring arrangement of claim 1, wherein said angle is in a range from 1° to 20°.

8. The leaf spring arrangement of claim 1, wherein said angle is in a range from 1° to 5°.

* * * * *